(12) United States Patent
Bryan et al.

(10) Patent No.: US 12,333,492 B2
(45) Date of Patent: Jun. 17, 2025

(54) SYSTEM AND METHOD FOR PERPETUAL INVENTORY MANAGEMENT

(71) Applicant: Walmart Apollo, LLC, Bentonville, AR (US)

(72) Inventors: Greg A. Bryan, Centerton, AR (US); Cristy C. Brooks, Cassville, MO (US); David Blair Brightwell, Bella Vista, AR (US); Benjamin D. Enssle, Bella Vista, AR (US); Matthew A. Jones, Bentonville, AR (US); Jesse L. Eaton, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/522,520

(22) Filed: Nov. 29, 2023

(65) Prior Publication Data

US 2024/0095672 A1 Mar. 21, 2024

Related U.S. Application Data

(63) Continuation of application No. 17/199,619, filed on Mar. 12, 2021, now Pat. No. 11,868,960, which is a (Continued)

(51) Int. Cl.
*G06Q 10/00* (2023.01)
*G06Q 10/08* (2023.01)
*G06Q 10/087* (2023.01)

(52) U.S. Cl.
CPC .......... *G06Q 10/087* (2013.01); *G06Q 10/08* (2013.01)

(58) Field of Classification Search
CPC .............................. G06Q 10/087; G06Q 10/08
See application file for complete search history.

(56) References Cited

U.S. PATENT DOCUMENTS

| 5,392,382 A | 2/1995 | Schoppers |
|---|---|---|
| 5,544,282 A | 8/1996 | Chen |

(Continued)

FOREIGN PATENT DOCUMENTS

| CA | 2682886 | 4/2010 |
|---|---|---|
| CN | 204270352 U | 4/2015 |

(Continued)

OTHER PUBLICATIONS

"Improve Productivity and Customer Service in the Retail Store With Automated Inventory Management: The MC2100 in retail"; Zebra Technologies; Apr. 2015; pp. 1-6.

(Continued)

*Primary Examiner* — Rokib Masud
(74) *Attorney, Agent, or Firm* — Fitch, Even, Tabin & Flannery LLP

(57) ABSTRACT

An analysis of the scans is performed to determine whether the selected item was moved from the back room to the shelf, then returned from the shelf to the back room. The analysis also determines a re-bin time when the selected product was returned to the back room. An adjustment to the PI is blocked when last PI adjustment time is later than the re-bin time. An adjustment to the PI is also blocked when an audit indicator is received at the interface indicating that the retail store is under an audit. An adjusted PI value is determined when the analysis indicates that the selected item was moved from the back room to the shelf, then returned from the shelf, the adjusted PI value being at least one more than the shelf capacity value.

20 Claims, 3 Drawing Sheets

Related U.S. Application Data continuation of application No. 15/915,410, filed on Mar. 8, 2018, now abandoned.

(60) Provisional application No. 62/471,427, filed on Mar. 15, 2017.

(56) References Cited

U.S. PATENT DOCUMENTS

| | | |
|---|---|---|
| 5,963,919 A | 10/1999 | Brinkley |
| 6,681,990 B2 | 1/2004 | Vogler |
| 6,726,099 B2 | 4/2004 | Becker |
| 6,758,403 B1 | 7/2004 | Keys |
| 6,876,991 B1 | 4/2005 | Owen |
| 6,889,165 B2 | 5/2005 | Lind |
| 7,084,769 B2 | 8/2006 | Bauer |
| 7,222,786 B2 | 5/2007 | Renz |
| 7,370,005 B1 | 5/2008 | Ham |
| 7,401,057 B2 | 7/2008 | Eder |
| 7,480,623 B1 | 1/2009 | Landvater |
| 7,523,065 B2 | 4/2009 | Eder |
| 7,552,066 B1 | 6/2009 | Landvater |
| 7,580,848 B2 | 8/2009 | Eder |
| 7,616,117 B2 | 11/2009 | Streeb |
| 7,693,757 B2 | 4/2010 | Zimmerman |
| 7,788,119 B2 | 8/2010 | Najmi |
| 7,792,709 B1 | 9/2010 | Trandal |
| 7,950,579 B2 | 5/2011 | Gray |
| 7,954,712 B2 | 6/2011 | Babcock |
| 8,091,782 B2 | 1/2012 | Cato |
| 8,107,736 B2 | 1/2012 | Brown |
| 8,189,855 B2 | 5/2012 | Opalach |
| 8,191,672 B2 | 6/2012 | Kondo |
| 8,195,533 B1 | 6/2012 | Mishra |
| 8,224,717 B2 | 7/2012 | Giacobbe |
| 8,260,456 B2 | 9/2012 | Siegel |
| 8,321,302 B2 | 11/2012 | Bauer |
| 8,321,303 B1 | 11/2012 | Krishnamurthy |
| 8,346,630 B1 | 1/2013 | McKeown |
| 8,423,431 B1 | 4/2013 | Rouaix |
| 8,521,620 B2 | 8/2013 | Livingston |
| 8,577,136 B1 | 11/2013 | Ascher |
| 8,616,822 B1 | 12/2013 | Winkler |
| 8,732,039 B1 | 5/2014 | Chen |
| 8,965,796 B1 | 2/2015 | Gala |
| 9,120,622 B1 | 9/2015 | Elazary |
| 9,165,277 B2 | 10/2015 | Jones |
| 9,171,278 B1 | 10/2015 | Kong |
| 9,205,886 B1 | 12/2015 | Hickman |
| 9,280,757 B2 | 3/2016 | Parpia |
| 9,378,484 B1 | 6/2016 | Russell |
| 9,415,935 B1 | 8/2016 | MacFarlane |
| 9,758,301 B2 | 9/2017 | Porat |
| 10,019,803 B2 | 7/2018 | Venable |
| 10,089,055 B1 | 10/2018 | Fryman |
| 10,130,177 B2 | 11/2018 | Jones |
| 10,130,232 B2 | 11/2018 | Atchley |
| 10,138,060 B1 | 11/2018 | Mantha |
| 10,169,738 B2 | 1/2019 | Jones |
| 10,189,642 B2 | 1/2019 | High |
| 10,192,157 B2 | 1/2019 | Cote |
| 10,289,990 B2 | 5/2019 | Rizzolo |
| 10,311,400 B2 | 6/2019 | Mascorro Medina |
| 10,360,548 B2 | 7/2019 | Brooks |
| 10,373,116 B2 | 8/2019 | Medina |
| 10,453,009 B2 | 10/2019 | Ulrich |
| 10,467,587 B2 | 11/2019 | Bogolea |
| 10,489,677 B2 | 11/2019 | Rzeszutek |
| 10,505,057 B2 | 12/2019 | Haist |
| 10,546,258 B2 | 1/2020 | Jones |
| 10,552,792 B2 | 2/2020 | Mattingly |
| 10,558,947 B2 | 2/2020 | Bryan |
| 10,997,552 B2 | 5/2021 | Bryan |
| 11,055,662 B2 | 7/2021 | Bryan |
| 11,282,157 B2 | 3/2022 | Bryan |
| 11,449,828 B2 | 9/2022 | Bryan |
| 11,501,251 B2 | 11/2022 | Bryan |
| 11,715,066 B2 | 8/2023 | Bryan |
| 11,797,929 B2 | 10/2023 | Bryan |
| 11,816,628 B2 | 11/2023 | Bryan |
| 11,868,960 B2 | 1/2024 | Bryan |
| 2001/0047293 A1 | 11/2001 | Waller |
| 2002/0138336 A1 | 9/2002 | Bakes |
| 2002/0174001 A1 | 11/2002 | Henry |
| 2003/0216969 A1 | 11/2003 | Bauer |
| 2003/0233277 A1 | 12/2003 | Saunders |
| 2004/0158507 A1 | 8/2004 | Meek |
| 2006/0157150 A1 | 7/2006 | Blakeslee |
| 2006/0184511 A1 | 8/2006 | Koo |
| 2007/0021864 A1 | 1/2007 | Mountz |
| 2007/0144991 A1 | 6/2007 | Hansl |
| 2007/0288439 A1 | 12/2007 | Rappaport |
| 2008/0077510 A1 | 3/2008 | Dielemans |
| 2008/0114651 A1 | 5/2008 | Jain |
| 2008/0120205 A1 | 5/2008 | Hoopes |
| 2008/0140491 A1 | 6/2008 | Jain |
| 2008/0255968 A1 | 10/2008 | Heinrichs |
| 2008/0270269 A1 | 10/2008 | Myers |
| 2008/0288595 A1 | 11/2008 | Liu |
| 2009/0060349 A1 | 3/2009 | Linaker |
| 2009/0063310 A1 | 3/2009 | Alonzo |
| 2009/0101713 A1 | 4/2009 | Ulrich |
| 2009/0157533 A1 | 6/2009 | Ohno |
| 2010/0023459 A1 | 1/2010 | Sundby |
| 2010/0095269 A1 | 4/2010 | Bouillet |
| 2010/0106609 A1 | 4/2010 | Sherman |
| 2010/0138037 A1 | 6/2010 | Adelberg |
| 2011/0093418 A1 | 4/2011 | Kwok |
| 2011/0131557 A1 | 6/2011 | Bouillet |
| 2012/0209734 A1 | 8/2012 | Brooks |
| 2012/0259655 A1 | 10/2012 | Madreperla |
| 2012/0310781 A1* | 12/2012 | Battle ............ G06Q 40/00 705/26.63 |
| 2013/0018696 A1 | 1/2013 | Meldrum |
| 2013/0124189 A1 | 5/2013 | Baldwin |
| 2013/0211870 A1 | 8/2013 | Lawson |
| 2014/0006131 A1 | 1/2014 | Causey |
| 2014/0006229 A1 | 1/2014 | Birch |
| 2014/0067634 A1 | 3/2014 | Sowder |
| 2014/0100769 A1 | 4/2014 | Wurman |
| 2014/0101088 A1 | 4/2014 | Hall |
| 2014/0122391 A1 | 5/2014 | Mugan |
| 2014/0143039 A1 | 5/2014 | Branton |
| 2014/0180865 A1* | 6/2014 | Argue ............ G06Q 30/0633 705/26.7 |
| 2014/0201042 A1 | 7/2014 | Meyer |
| 2014/0247116 A1 | 9/2014 | Davidson |
| 2014/0344118 A1 | 11/2014 | Parpia |
| 2014/0379535 A1 | 12/2014 | Briet |
| 2015/0039373 A1 | 2/2015 | Anand |
| 2015/0154256 A1 | 6/2015 | McKenna |
| 2015/0178654 A1 | 6/2015 | Glasgow |
| 2015/0235157 A1 | 8/2015 | Avegliano |
| 2015/0242805 A1* | 8/2015 | Sakurai ............ G06Q 30/00 705/28 |
| 2015/0379366 A1 | 12/2015 | Nomura |
| 2016/0042315 A1 | 2/2016 | Field-Darragh |
| 2016/0114488 A1 | 4/2016 | Mascorro Medina |
| 2016/0132823 A1 | 5/2016 | Swafford |
| 2016/0132910 A1* | 5/2016 | Appel ............ G06Q 30/0202 705/7.31 |
| 2016/0171428 A1 | 6/2016 | Gooijer |
| 2016/0371613 A1 | 12/2016 | Ulrich |
| 2017/0148005 A1 | 5/2017 | Murn |
| 2017/0155788 A1 | 6/2017 | Kobayashi |
| 2017/0193430 A1 | 7/2017 | Barreira Avegliano |
| 2017/0200106 A1 | 7/2017 | Jones |
| 2017/0277863 A1 | 9/2017 | Subra |
| 2017/0287038 A1 | 10/2017 | Krasadakis |
| 2018/0005174 A1 | 1/2018 | Dixon |
| 2018/0060804 A1 | 3/2018 | Cheruku |
| 2018/0089613 A1 | 3/2018 | Chen |
| 2018/0152884 A1 | 5/2018 | Hu |
| 2018/0268355 A1 | 9/2018 | Bryan |
| 2018/0268356 A1 | 9/2018 | Bryan |

(56) References Cited

U.S. PATENT DOCUMENTS

| | | |
|---|---|---|
| 2018/0268364 A1 | 9/2018 | Bryan |
| 2018/0268365 A1 | 9/2018 | Bryan |
| 2018/0268366 A1 | 9/2018 | Bryan |
| 2018/0268367 A1 | 9/2018 | Bryan |
| 2018/0268509 A1 | 9/2018 | Bryan |
| 2018/0341906 A1 | 11/2018 | Bryan |
| 2019/0057449 A1 | 2/2019 | Berd |
| 2019/0073775 A1 | 3/2019 | Lam |
| 2019/0149725 A1 | 5/2019 | Adato |
| 2019/0156821 A1 | 5/2019 | Zamora Duran |
| 2019/0215424 A1 | 7/2019 | Adato |
| 2019/0291954 A1 | 9/2019 | Lee |
| 2019/0303863 A1 | 10/2019 | Ghosh |
| 2020/0342561 A1 | 10/2020 | Bryan |
| 2020/0349499 A1 | 11/2020 | Bryan |
| 2021/0056506 A1 | 2/2021 | Bryan |
| 2021/0090015 A1 | 3/2021 | Bryan |
| 2021/0201255 A1 | 7/2021 | Bryan |
| 2021/0264360 A1 | 8/2021 | Bryan |
| 2021/0295253 A1 | 9/2021 | Bryan |
| 2023/0334422 A1 | 10/2023 | Bryan |
| 2024/0013148 A1 | 1/2024 | Bryan |
| 2024/0046205 A1 | 2/2024 | Bryan |

FOREIGN PATENT DOCUMENTS

| | | |
|---|---|---|
| EP | 1901215 | 3/2008 |
| WO | 2015184286 | 12/2015 |
| WO | 2016109251 | 7/2016 |

OTHER PUBLICATIONS

"Shelf Monitor"; Tech Mahindra; https://www.techmahindra.com/industries/Enterprise/retail_and_cpg/retail/solutions/shelf_monitor.aspx; 2016; pp. 1-1.

Angell, Robert C., "Control of State-Wide Liquor Inventories", National Association of Cost Accountants; NACA Bulletin (pre-1986); Feb. 15, 1948; pp. 1-9.

Bourzac, Katherine; "A Robot Takes Stock"; https://www.technologyreview.com/s/428374/arobottakesstock/; Published Jun. 29, 2012; pp. 1-4.

Fraunhofer; "The flying inventory assistant"; http://www.fraunhofer.de/en/press/research-news/2014/december/the-flying-inventoryassistant.html; Published Dec. 1, 2014; pp. 1-3.

Gruen, Thomas W., et al.; "A Comprehensive Guide to Retail Out-of-Stock Reduction in the Fast-Moving Consumer Goods Industry"; 2007; 71 pgs.

Kang, Yun, et al.; "Information Inaccuracy in Inventory Systems—Stock Loss and Stockout"; Massachusetts Institute of Technology; Published Aug. 23, 2004; 29 pages.

Lowe's Home Improvement; "Lowe's Introduces LoweBot"; https://www.youtube.com/watch?v=hP3yfGHTXFo; Published on Aug. 30, 2016; pp. 1-10.

McClain, John O; Cornell University; "Simulating Inventory Control with Orders that Cross during Lead Time"; http://www.exinfm.com/excel%20files/Inventory_Simulation.xls; Mar. 22, 2002; pp. 1-60.

Moyer, Ted; TotalRetail; "5 Steps to Solving the Out-of-Stock Problem"; http://www.mytotalretail.com/article/5stepstosolvingtheoutofstockproblem/; Published Apr. 19, 2016; pp. 1-7.

SAP; "How to Set up and Manage a Perpetual Inventory System"; SAP; Jun. 22, 2016; pp. 1-108.

Stuart, Sophia; "Meet Tally, the Robot That Knows What's on Store Shelves"; http://in.pcmag.com/roboticsautomation/99587/news/meettallytherobotthatknowswhatsonstoreshelves; Published Jan. 27, 2016; pp. 1-8.

Trujillo, Paul; "Walmart is Addressing Inventory Problems With a New System"; http://www.waspbarcode.com/buzz/walmart-2/; Nov. 15, 2016; pp. 1-7.

Vanian, Jonathan; "Target's New Robot Helper Is Busy at Work on Aisle 3"; http://fortune.com/2016/04/28/targettestingrobotinventorysimbe/; Published Apr. 28, 2016; pp. 1-8.

Wharton School; "Robot Assistants in Aisle 10: Will Shoppers Buy It?"; http://knowledge.wharton.upenn.edu/article/robots-aisle-10-will-shoppers-like/; Published Sep. 7, 2016; pp. 1-5.

\* cited by examiner

SYSTEM AND METHOD FOR PERPETUAL INVENTORY MANAGEMENT

CROSS-REFERENCE TO RELATED APPLICATIONS

This application is a continuation of U.S. application Ser. No. 17/199,619, filed Mar. 12, 2021, which is a continuation of U.S. application Ser. No. 15/915,410, filed Mar. 8, 2018, which claims the benefit of U.S. Provisional Application No. 62/471,427, filed Mar. 15, 2017, all of which are incorporated herein by reference in their entireties.

TECHNICAL FIELD

This invention relates generally to the management of perpetual inventory values, and more particularly, to the management of perpetual inventory values based upon back room activity.

BACKGROUND

Stores utilize various measures to keep track of and manage products. One such measure is the perpetual inventory (PI) value associated with a product. In aspects, the PI value represents the quantity of product in the store. The PI value typically changes over time so as to accurately reflect the number of actual products in the store. For instance, products are purchased by customers and removed from the store affecting the PI value. Shipments arrive at the store and include additional products also affecting the PI value.

Sometimes the PI value does not accurately reflect the correct number of products in the store. This can happen for a variety of reasons including the mis-scanning products as the products leave or depart the store, or other forms of human error. If the PI value is incorrect, then various problems can develop. For instance, shipments can be ordered at the wrong times and for the wrong quantity of products.

Maintaining accurate PI values is complicated by the various locations a product can be located in the store. In addition to the retail shelf (where the customer has access to the product), a back room may exist where shipments are stored. Products are moved to the retail shelf as the retail shelf empties.

BRIEF DESCRIPTION OF THE DRAWINGS

Disclosed herein are embodiments of systems, apparatuses and methods pertaining to adjusting PI values. This description includes drawings, wherein.

Figure 1:
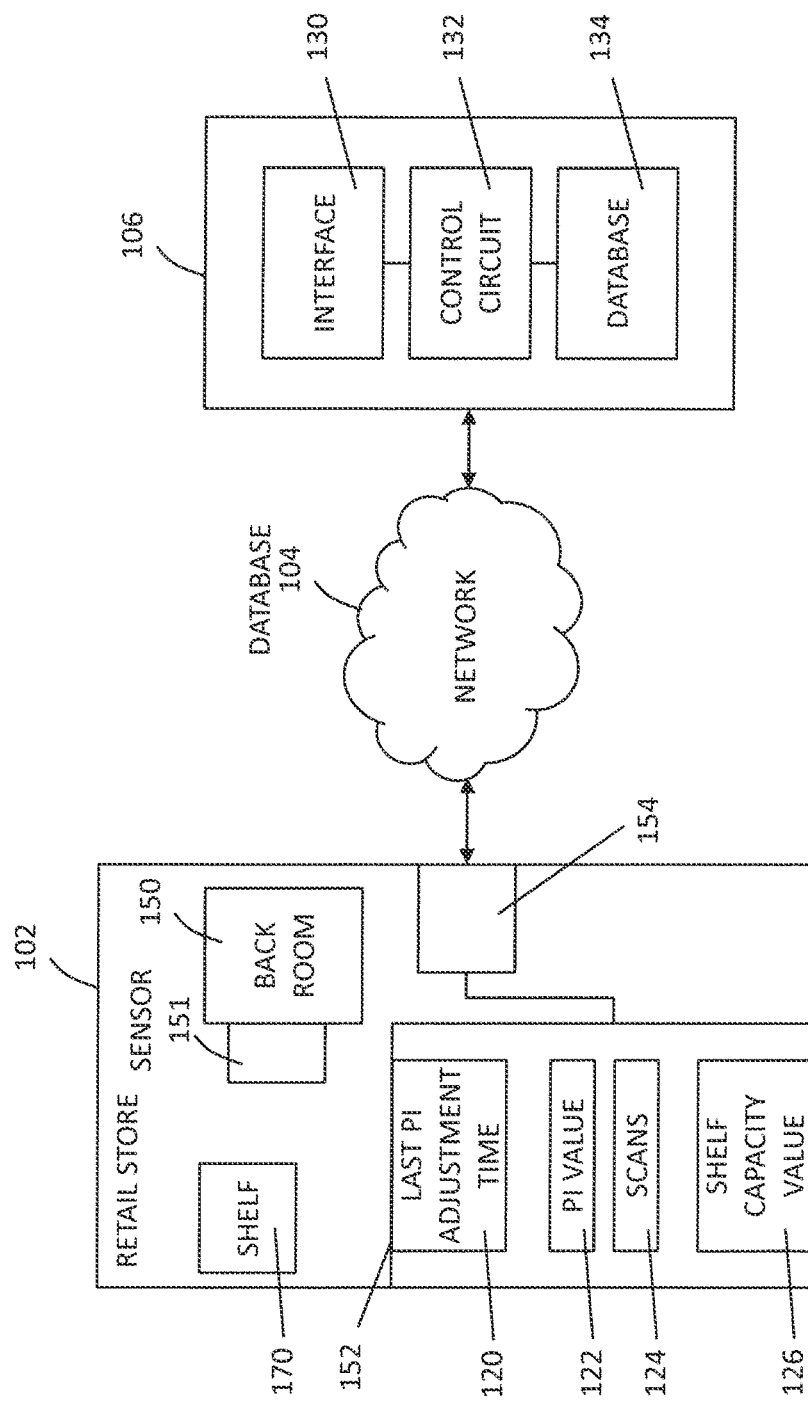
FIG. 1 is a block diagram for adjusting PI values in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, systems, apparatuses and methods are provided that adjust the PI value of a selected product based upon the movements of products between the back room and a shelf located in a customer-accessible area of the store. The confidence level of the accuracy of any PI adjustment is maximized because adjustments to the PI are blocked under certain circumstances.

In aspects, a PI adjustment is made when it is determined that the shelf is full. The amount of the adjustment is sufficient to increase the PI value to be at least one more than the shelf capacity.

In some of these embodiments, a system manages a perpetual inventory (PI) value of products that are moved between a back room and a shelf of a retail store. The back room is a storage area that is not accessible to the public. The system includes an interface, a database, and a control circuit. The shelf is located in an area of the store accessible to customers (where customers are permitted), and may be a top shelf that is not accessible to the customer or a retail shelf that is accessible to the customer.

The interface is configured to receive from the retail store scans of the back room made by one or more first sensors in the back room. The interface is further configured to receive from the retail store a perpetual inventory (PI) value for a selected product. The interface is additionally configured to receive from the retail store a last PI adjustment time when the PI value was last adjusted by the retail store.

The database is configured to store the scans, the PI value, and a shelf capacity value. The shelf capacity value is an amount of the selected product capable of being stored on the shelf.

The control circuit is coupled to the interface and the database and is configured to obtain the PI value, the scans, and the shelf capacity value from the database. The control circuit is also configured to perform an analysis of the scans to determine whether the selected item was moved from the back room to the shelf, then returned from the shelf. The analysis also determines a re-bin time when the selected product was returned to the back room from the shelf.

The control circuit is configured to block an adjustment to the PI when last PI adjustment time is later than the re-bin time and to block an adjustment to the PI when an audit indicator is received at the interface indicating that the retail store is under an audit.

The control circuit is configured to determine an adjusted PI value when the analysis indicates that the selected item was moved from the back room to the shelf, then returned from the shelf. The adjusted PI value is at least one more than the shelf capacity value.

In aspects, the control circuit is configured to transmit the adjusted PI value to the store via the interface. In other examples, the interface also receives second scans from one or more second sensors disposed at the shelf. In other aspects, the control circuit also analyzes the second scans to determine whether the selected item was moved from the back room to the shelf, then returned from the shelf.

In other examples, the re-bin time is confirmed. In aspects, a determination that no shipment of the item has been received at the retail store confirms that the item has been re-binned and the re-bin time.

In some other examples, the control circuit sends a message to an employee of the retail store, and the message advises the removal of at least some of the selected product from the retail store to another location. In other aspects, the control circuit sends a message to an employee of the retail store advising of the change in the PI value. In some examples, at least some of the sensors are cameras deployed on an automated vehicle. In other examples, the cameras are fixed in location.

In others of these embodiments, scans of the back room made by one or more sensors in the back room are received from a retail store. The back room is not accessible to the public. A perpetual inventory (PI) value for a selected product is also received from the retail store. Further, a last PI adjustment time when the PI value was last adjusted by the retail store is received from the retail store. The scans, the PI value, and a shelf capacity value are stored in a database. The shelf capacity value is an amount of the selected product capable of being stored on the shelf. The PI value, the scans, and the shelf capacity value are obtained from the database.

An analysis of the scans is performed to determine whether the selected item was moved from the back room to the shelf, then returned from the shelf to the back room. The analysis also determines a re-bin time when the selected product was returned to the back room. An adjustment to the PI is blocked when last PI adjustment time is later than the re-bin time. An adjustment to the PI is also blocked when an audit indicator is received at the interface indicating that the retail store is under an audit. An adjusted PI value is determined when the analysis indicates that the selected item was moved from the back room to the shelf, then returned from the shelf, the adjusted PI value being at least one more than the shelf capacity value.

In still others of these embodiments a system manages a perpetual inventory (PI) value of products that are moved between a back room and a product display unit of a retail store. The back room is an area that is not accessible to the public. The system includes one or more sensors, a product display unit, an automated vehicle, a transceiver circuit, a network, an interface, a database, and a control circuit.

The one or more sensors are disposed in a backroom of a retail store. The sensors are configured to obtain scans of the back room. The product display unit is disposed in the retail store.

The automated vehicle is configured to move a selected product between the backroom and the product display unit. The transceiver circuit is disposed at the retail store and coupled to the one or more sensors and the automated vehicle. The network is coupled to the transceiver circuit.

The interface is disposed at a central processing center, is coupled to the network, and is configured to receive from the retail store scans of the back room made by one or more first sensors in the back room. The database is disposed at a central processing center and is configured to store the scans, a perpetual inventory (PI) value for a selected product, a last PI adjustment time when the PI value was last adjusted, and a product display capacity value, the product display capacity value being an amount of the selected product capable of being stored on the product display.

The control circuit is disposed at a central processing center and is coupled to the interface and the database. The control circuit is configured to obtain the PI value, the scans, and the product display capacity value from the database. The control circuit is further configured to perform an analysis of the scans to determine whether the selected item was moved from the back room to the product display unit by the automated vehicle, then returned from the product display unit by the automated vehicle. The analysis also determines a re-bin time when the selected product was returned to the back room.

The control circuit is still further configured to block an adjustment to the PI when last PI adjustment time is later than the re-bin time. The control circuit is further configured to block an adjustment to the PI when an audit indicator is received at the interface indicating that the retail store is under an audit. The control circuit is still further configured to determine an adjusted PI value when the analysis indicates that the selected item was moved from the back room to the product display unit by the automated vehicle, then returned from the product display unit by the automated vehicle. The adjusted PI value is at least one more than the product display capacity value and based at least in part upon adjusted PI values of the selected product in other retail stores.

In aspects, the present approaches reduce the amount of products being ordered by retail stores. For example, the amount of particular products was reduced by around 60% over a 52 week period.

Referring now to FIG. 1, one example of a system 100 for adjusting the PI value of a selected product in a retail store 102 is described. The retail store 102 may be any type of retail store, for example, a discount center, a grocery store, a department store, or a hardware store to mention a few examples. The retail store 102 includes a back room 150. The back room 150 stores product and is not accessible to the public.

The retail store includes a database 152 that stores for each product a PI value 122, a last PI adjustment time 120, and a shelf capacity value 126. The PI value 122 for the selected product indicates the amount of a selected product in the retail store. The last PI adjustment time 120 represents the time at which the store last adjusted the PI value 122. The shelf capacity value 126 indicates an amount of a selected product that can be placed on a shelf 170. The shelf 170 may be any product display unit. The shelf capacity (or product display capacity) value 126 may be fixed or variable, and can be manually entered into the database 152 by a user utilizing any appropriate data entry device. The shelf capacity value 126 may indicate the value for a top shelf in the store (a shelf that is not accessible to the public), a retail shelf (a shelf that is accessible to the public), or the summation of the capacity for both of these shelves. The top shelf and the retail shelf are in an area of the retail store where access by the public is permitted.

One or more sensors 151 obtain scans 124 of the selected product in the back room 150. Sensors 151 are any type of scanning device (e.g., a camera that obtains visual images or an RFID sensor that senses RFID tags) that are configured to detect the presence of a product. Other examples of sensors are possible. In some examples, at least some sensors 151 are cameras deployed on an automated vehicle (e.g., an automated ground vehicle or an aerial drone). The scans 124 may be stored in the database 152.

A communication device 154 allows the retail store 102 to communicate with devices and entities that are external to the store. The communication device 154 may include any combination of hardware or software that allows communications to be received at the retail store 102, and makes transmissions from the retail store 102. In one example, the communication device 154 may be a transceiver circuit. The communication device 154 may be deployed within or at another device (e.g., a modem, a smart phone, or a personal computer, to mention a few examples).

Cloud network 104 is coupled to the communication device 154 (e.g., a transceiver) at the retail store 102. The cloud network 104 may be any type of computer or communication network and may include routers, gateways, and servers to mention a few examples of devices that can form or be utilized in the network 104. The cloud network 104 may also be combinations of various types of networks.

The apparatus 106 includes an interface 130, a control circuit 132, and a database 134. The interface 130 is configured to receive from the retail store 102 the last PI adjustment time 120 (or information from which the last PI adjustment time can be derived), the perpetual inventory (PI) value 122 (or information from which the PI value can be derived) associated with the selected product, the scans 124, and the shelf capacity value 126. These items are stored in the database 134. In aspects, the apparatus 106 may be disposed at a central processing center or location such as a business headquarters. In other examples, the apparatus 106 is disposed at one or more remote locations (e.g., retail stores). Advantageously, disposing the apparatus at a central processing center reduces data storage cost, since all data can be stored at a single location instead of at multiple locations.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 132 may be configured (for example, by using corresponding programming stored in a memory as will be well understood by those skilled in the art) to carry out one or more of the steps, actions, and/or functions described herein.

The control circuit 132 is coupled to the interface 130 and the database 134 and is configured to obtain the PI value 122, the scans 124, and the shelf capacity value 126 from the database 134. The control circuit 132 is also configured to perform an analysis of the scans 124 to determine whether the selected item was moved from the back room 150 to the shelf 170, then returned from the shelf 170. The analysis also determines a re-bin time when the selected product was returned to the back room 150 from the shelf 170. The control circuit 132 may also analyze information to derive the last PI adjustment time and the PI value 122 (when these values are not directly sent from the retail store).

In aspects, the control circuit 132 analyzes the scans and determines a location for the product. For example, visual images obtained by one or more cameras (located in the back room 150) may be analyzed utilizing standard image processing approaches to determine if the product is in the image. If the product is detected in the image, then the product is determined to be located in the back room 150. When the product no longer is located in the images, then the product is determined not to be located in the back room 150. Then, the images are analyzed to determine when the product is returned to the back room 150. The time when the product returns is considered the re-bin time (i.e., the time the product returns to the back room 150 after being away from the back room 150).

The control circuit 132 is configured to block an adjustment to the PI value 122 when last PI adjustment time 120 is later than the re-bin time and to block an adjustment to the PI when an audit indicator is received at the interface 130 indicating that the retail store is under an audit. By "audit," it is meant an inspection or verification of the accounts, inventory, and/or records of the retail store. The indicator may be received from the retail store or from some other source (e.g., company headquarters).

The control circuit 132 is configured to determine an adjusted PI value when the analysis indicates that the selected item was moved from the back room 150 to the shelf 170, then returned from the shelf 170. The adjusted PI value is at least one more than the shelf capacity value 126. In some aspects, the adjusted PI value is exactly one more than the shelf capacity value 126. However, if other information indicates additional product exists in the store 102, then the adjusted PI value is set to be any integer value that is greater than the shelf capacity value 126 and depends upon the additional amount (more than one more) of product that has been determined to exist.

In still other examples, the adjustments to the PI value made by the control circuit 132 may be based at least in part upon adjusted PI values of the selected product in other retail stores. For example, if all other retail stores are adding one to the PI value, then this information may be considered. In this way, the experience of and information concerning the adjusting of PI values in other stores can be used to produce a more accurate PI adjustments at the present store. The database 134 may store results of adjustments made to PI values associated with other stores.

In aspects, the control circuit 132 is configured to transmit the adjusted PI value to the store via the interface 130. In other examples, the interface also receives second scans from one or more second sensors disposed at the shelf. In other aspects, the control circuit 132 also analyzes the second scans to determine whether the selected item was moved from the back room 150 to the shelf 170, then returned from the shelf 170.

In some examples, the shelf 170 is a top shelf that is not accessible to the public. In some aspects, retail shelves (accessible to customers) store products, and the top shelf is another shelf (or storage unit, display unit, or other type of structure) that is disposed physically above the retail shelves. In aspects, the top shelf is configured to be at such a height (or is configured with some barrier or restraint) so that products on the top shelf are inaccessible and cannot be retrieved by the public.

In other examples, the re-bin time is confirmed with a determination that no shipment of the item has been received at the retail store 102. Confirmation may be obtained by analyzing information received from the store (e.g., records of shipments).

In some examples, the control circuit 132 sends a message to an employee of the retail store 102, and the message advises the employee to remove at least some of the selected product from the retail store 102 to another location. In other aspects, the control circuit 132 sends a message to an employee of the retail store 102 advising the employee of the change in the PI value.

Figure 2:
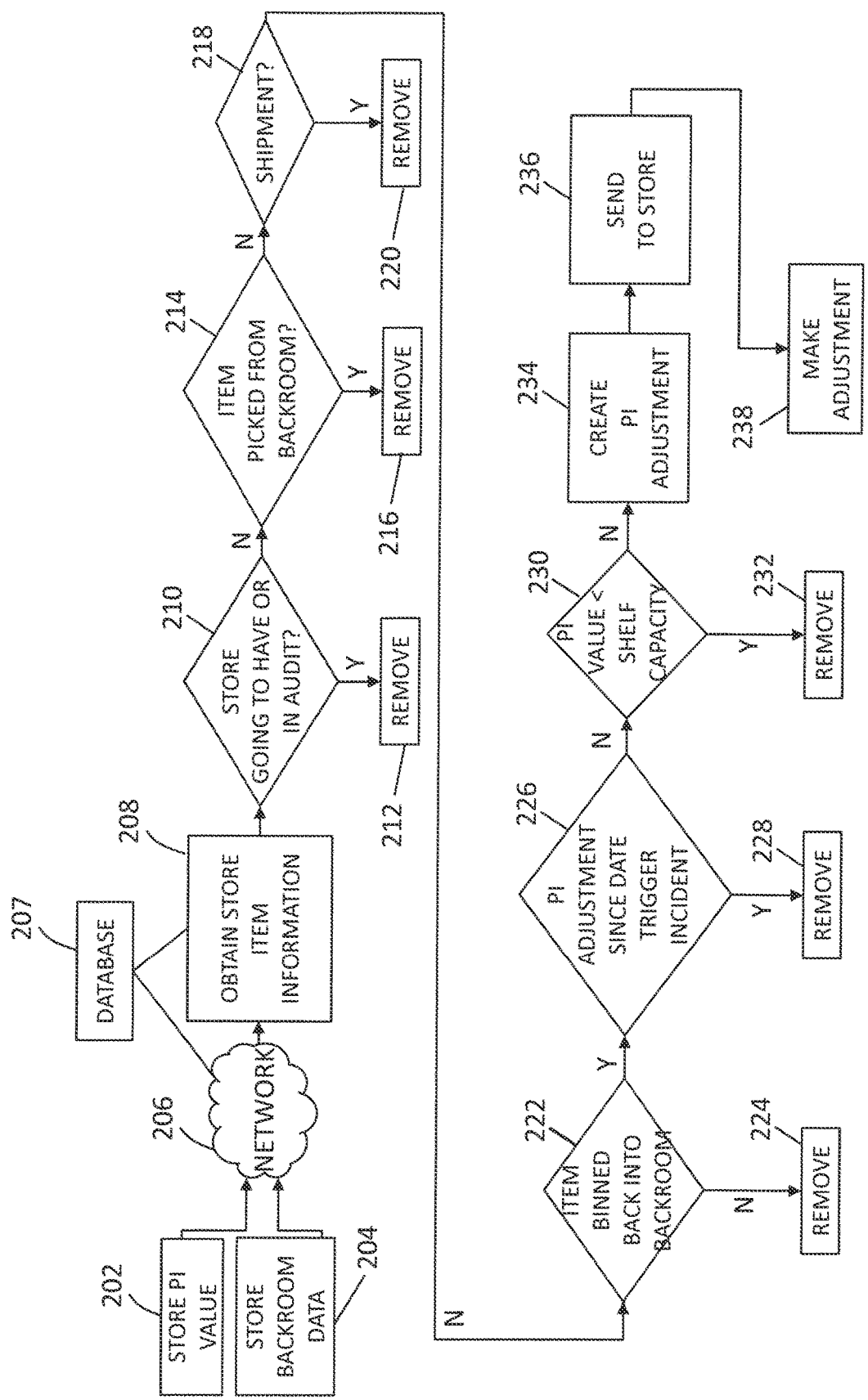
FIG. 2 is a flowchart of an approach for adjusting PI values in accordance with some embodiments.

Referring now to FIG. 2, one example of an approach for adjusting a PI value of a selected product is described. The PI value 202 of a product at the retail store and back room data 204 are transmitted over a network 206 and stored in a database 207. In aspects, the approach described in FIG. 2 may be performed at a central processing center. In other aspects, the approach may be performed at a retail store.

At step 208, item information is obtained from the database 207. The item information may include shipping information concerning the product, audit information, information indicating whether the product has been picked from the back room, the last PI adjustment time, the shelf capacity value for the product (the amount of the product the top shelf, the retail shelf, or both are capable of storing), and whether the product was re-binned in the back room (after the product had been absent from the back room). Other examples of item information are possible.

At step 210, it is determined if the store is scheduled to have an audit or is in an audit. An audit indicator sent in a message from the retail store that there is an on-going audit or a planned audit at the retail store is received. In other aspects, an audit status may be periodically sent from the retail store to indicate an audit at the store, or the absence of an audit at the store. If the answer is affirmative, at step 212 the PI of the item is removed from consideration of having an adjustment made.

If the answer is negative at step 210, at step 214, it is determined if the item has been picked or removed from the back room. This determination may be made by an analysis of product scans made by one or more sensors in the back room. If the answer at step 214 is affirmative, then at step 216 the PI value of the item is removed from consideration of having an adjustment made.

If the answer is negative at step 214, then at step 218 it is determined if the store had a shipment of the item. This may, for example, may be determined by an analysis of shipping information. If the answer at step 218 is affirmative, then the PI value of the item is removed from consideration of having an adjustment made at step 220.

If the answer is negative at step 218, at step 222 it is determined if the item was binned back into the back room (the item was returned to the back room after being absent from the back room). If the answer is negative, then the PI value of the item is removed from consideration of having an adjustment made at step 224.

If the answer at step 222 is affirmative, then at step 226 it is determined whether there has been a PI value adjustment since the time or date a trigger incident occurred. In aspects, the trigger incident may be the re-binning of the product. The adjustment to the PI value may have occurred by application of an algorithm to adjust the PI value, may be an adjustment made at the store, may be a claims adjustment at the store, or may be an adjustment made by some other system. If the answer at step 226 is affirmative, at step 228 the PI value of the item is removed from consideration of having an adjustment made to the PI value for the product.

If the answer is negative at step 226, at step 230 it is determined if the PI value is less than the shelf capacity (e.g., the capacity of the top shelf, the retail shelf, or both). If the answer is negative at step 230, at step 232 the PI value of the item is removed from consideration of having an adjustment made to the PI value for the product.

If the answer at step 230 is affirmative, at step 234 a PI adjustment is determined. In one aspect, the PI adjustment is the shelf capacity (e.g., the capacity of the top shelf, the retail shelf, or both) plus one. In other examples, when other product is located at other locations, then the PI value may be adjusted to the shelf capacity, plus the amount of other products in the store, plus one.

In still other examples, the adjustments to the PI value may be based at least in part upon adjusted PI values of the selected product in other retail stores. For example, if all other retail stores are adding one to the PI value, then this information may be considered. In this way, the experience of and information concerning the adjusting of PI values in other stores can be used to produce a more accurate PI adjustments at the present store.

At step 236, the adjustment is sent to the store. In some aspects, the adjusted PI value (the original PI value that has had the adjustment applied) is sent to the retail store instead of the adjustment. At step 238, the PI value is adjusted at the store by the adjustment.

Figure 3:
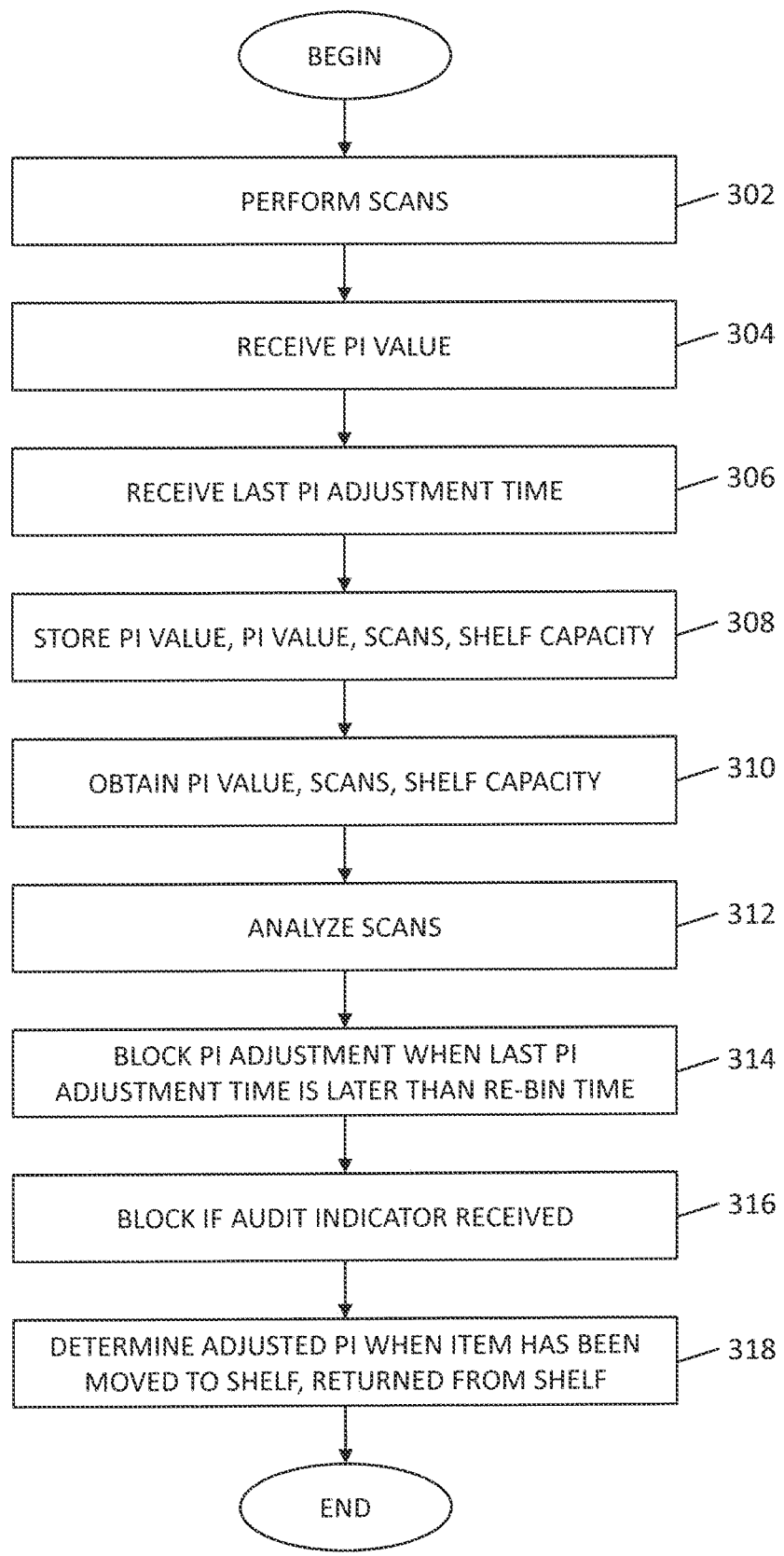
FIG. 3 is a flowchart of another approach for adjusting PI values in accordance with some embodiments.

Referring now to FIG. 3, another example of an approach for adjusting a PI value of a selected product is described. The approach may be implemented at least in part at a central processing center that is coupled to a computer network (or networks). In still other examples, the approaches may be performed at the retail store.

At step 302, scans of the back room of a retail store made by one or more first sensors in the back room are received from the retail store. The back room is a location where products are stored and is not accessible to the public. The non-accessibility of the back room may be due to security measures (e.g., the back room is locked), location (the back room is at the rear of the store), other factors, or a combination of factors.

At step 304, a perpetual inventory (PI) value for a selected product is also received from the retail store. Alternatively, information from which the PI value may be derived may be received. The PI value may be transmitted in any appropriate message or format. At step 306, a last PI adjustment time when the PI value was last adjusted by the retail store is received from the retail store. Alternatively, information from which the last PI adjustment time may be derived can be received.

At step 308, the scans, the PI value (or information from which the PI value can be determined), and a shelf capacity value (also obtained from the retail store or some other source) are stored at a database at the central location.

The shelf capacity value is an amount of the selected product capable of being stored on the shelf. The shelf capacity value may be fixed or variable, and can be manually entered by a user at the retail store by the user utilizing any appropriate data entry device. The shelf capacity value may indicate the value for a top shelf in the store (a shelf that is noir accessible to the public), a retail shelf (a shelf that is accessible to the public), or the summation of the capacity for both of these shelves.

At step 310, the PI value, the scans, and the shelf capacity value are obtained from the database.

At step 312, an analysis of the scans is performed to determine whether the selected item was moved from the back room to the shelf, then returned from the shelf. The analysis also determines a re-bin time when the selected product was returned to the back room (a re-bin time). For example, the scans may be visual images that are processed and analyzed utilizing standard image processing approaches to determine if a particular product is in the image. If the product is detected in the image, then the product is determined to be located from the back room. On the other hand, when the product no longer is located in the images, then the product is determined not to be in the back room. Then, the images are analyzed to determine when the product returns to the back room, and this time is considered to be the re-bin time.

At step 314, an adjustment to the PI is blocked when last PI adjustment time is later than the re-bin time. At step 316, an adjustment to the PI is also blocked when an audit indicator is received at the interface indicating that the retail store is under an audit.

At step 318, an adjusted PI value is determined when the analysis at step 312 indicates that the selected item was moved from the back room to the shelf, then returned from the shelf. The adjusted PI value is at least one more than the shelf capacity value (e.g., exactly one more).

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system, the system comprising:
   a retail store, the retail store including a product display unit and a back room, wherein the back room is disposed within the store and structured and arranged so as to not be accessible to the public;
   one or more first sensors disposed in the back room of the retail store, the one or more first sensors deployed on an automated device or fixed in location within the backroom, wherein the one or more first sensors are configured to scan the backroom and obtain sensor data, the sensor data identifying a presence of a selected product in the backroom;
   a plurality of other retail stores that are electronically coupled to a network;
   an electronic interface disposed at a central processing center, coupled to the network, and configured to receive the sensor data from the one or more first sensors in the back room, the interface also configured to electronically receive adjusted PI values for the selected product from the other retail stores;
   a database that is configured to store the sensor data, a perpetual inventory (PI) value for the selected product, a last PI adjustment time when the PI value was last adjusted, and a product display capacity value associated with the product display unit;
   a control circuit disposed at a central processing center and that is electronically coupled to the interface and the database, the control circuit comprising electronic hardware, the control circuit configured to:
      obtain the PI value, the sensor data, and the product display capacity value from the database;
      determine whether the selected product was returned to the backroom from the product display unit;
      block an adjustment to the selected PI value when last PI adjustment time is later than a time threshold;
      block an adjustment to the selected PI value when an audit indicator is received at the interface indicating that the retail store is under an audit;
      determine an adjusted PI value based at least in part upon the product display capacity value and adjusted PI values of the selected product in the other retail stores that have been received from the other retail stores via the network.

2. The system of claim 1, wherein the control circuit is configured to transmit the adjusted PI value to the retail store via the network and the interface.

3. The system of claim 1, wherein the interface also receives second sensor data from one or more second sensors disposed at the selected product display unit.

4. The system of claim 3, wherein the control circuit also analyzes the second sensor data to determine whether the selected item was moved from the back room to the product display unit, then returned from the product display unit.

5. The system of claim 1, wherein the product display unit is a top shelf that is not accessible to the public.

6. The system of claim 1, wherein the time threshold comprises a re-bin time.

7. The system of claim 6 wherein the re-bin time is confirmed with a determination that no shipment of the item has been received at the retail store.

8. The system of claim 1, wherein the control circuit sends a message to an employee of the retail store, the message advising the removal of at least some of the selected product from the retail store to another location.

9. The system of claim 1, wherein the control circuit sends a message to an employee of the retail store advising of a change in the PI value.

10. The system of claim 1, wherein the sensor data comprises product scans.

11. A method, the method comprising:
    providing a retail store, the retail store including a product display unit and a back room, wherein the back room is disposed within the store and structured and arranged so as to not be accessible to the public;
    providing one or more first sensors disposed in the back room of the retail store, wherein the one or more first sensors are configured to scan the backroom and obtain sensor data, the sensor data identifying a presence of a selected product in the backroom;
    providing a plurality of other retail stores that are electronically coupled to a network;
    providing an electronic interface disposed at a central processing center, coupled to the network, and configured to receive sensor data from the one or more first sensors in the back room, the electronic interface also configured to receive adjusted PI values for a selected product from the other retail stores;
    providing a database that is configured to store the sensor data, a perpetual inventory (PI) value for the selected product, a last PI adjustment time when the PI value was last adjusted, and a product display capacity value associated with the product display unit;
    at a control circuit disposed at a central processing center, the control circuit comprising electronic hardware, the control circuit:
       obtaining the PI value, the sensor data, and the product display capacity value from the database;
       determining whether the selected item was returned to the backroom from the product display unit;
       blocking an adjustment to the selected PI value when last PI adjustment time is later than a time threshold;
       blocking an adjustment to the selected PI value when an audit indicator is received at the interface indicating that the retail store is under an audit;
       determining an adjusted PI value based at least in part upon the product display capacity value and adjusted PI values of the selected product in the other retail stores that have been received from the other retail stores via the network.

12. The method of claim 11, further comprising transmitting the adjusted PI value to the store via the interface.

13. The method of claim 11, further comprising receiving second sensor data from one or more second sensors disposed at the selected product display unit.

14. The method of claim 13, further comprising analyzing the second scans to determine whether the selected item was moved from the back room to the product display unit, then returned from the product display unit.

15. The method of claim 11, wherein the product display unit is a top shelf that is not accessible to the public.

16. The method of claim 11, wherein the time threshold comprises a re-bin time.

17. The method of claim 16 wherein the re-bin time is confirmed with a determination that no shipment of the item has been received at the retail store.

18. The method of claim 11, further comprising transmitting a message to an employee of the retail store, the message advising the removal of at least some of the product from the retail store to another location.

19. The method of claim 11, further comprising transmitting a message to an employee of the retail store advising of a change in the PI value.

20. The method of claim 11, wherein the sensor data comprises product scans.

\* \* \* \* \*